United States Patent [19]

Paige

[11] 3,785,251

[45] Jan. 15, 1974

[54] SEALING COMPOSITION FOR PNEUMATIC ACTUATOR

[75] Inventor: Walter Griffin Paige, Pasadena, Calif.

[73] Assignee: Burroughs Corporation, Detroit, Mich.

[22] Filed: May 13, 1971

[21] Appl. No.: 143,144

[52] U.S. Cl. .................................... 92/98 R, 92/92

[51] Int. Cl. .......................................... F01b 16/00

[58] Field of Search .................... 92/98, 99, 50, 48, 92/69, 75, 92

[56] References Cited

UNITED STATES PATENTS

| | | | |
|---|---|---|---|
| 1,995,659 | 3/1935 | Trier | 92/92 |
| 2,933,048 | 4/1960 | Bock | 92/92 |
| 3,094,074 | 6/1968 | Tuckey | 92/98 R |
| 988,472 | 4/1911 | Kinealy | 92/104 |
| 1,150,606 | 8/1915 | Kinealy | 92/104 |
| 3,213,606 | 10/1965 | Martin | 92/50 |
| 3,433,132 | 4/1969 | James | 92/98 R |
| 1,572,970 | 2/1926 | Stalker | 92/98 R |

*Primary Examiner*—Charles J. Myhre
*Assistant Examiner*—R. H. Lazarus
*Attorney*—Christie, Parker & Hale

[57] ABSTRACT

An improved pneumatic actuator for recording heads adjacent a magnetic memory disk is described. In a preferred embodiment a pair of heads are actuated toward a pair of disks by a single actuator having opposed flexible diaphragms. The diaphragms are each integral with one part of a two piece air chamber where the two elastomeric pieces are sealed together by a conical sealing surface. Air pressure within the chamber wedges the conical seal into tight engagement. A pair of rigid walled air tubes enter through the sides of the one of the pieces forming the air chamber. A flexible elastic sleeve protrudes into the chamber around each rigid walled tube and has an inside diameter smaller than the outside diameter of the tube for gripping the tube and holding it in position and so that air pressure within the chamber seals the sleeve against the tube.

5 Claims, 3 Drawing Figures

INVENTOR.
WALTER GRIFFIN PAIGE
BY
Christie, Parker & Hale
ATTORNEYS

SEALING COMPOSITION FOR PNEUMATIC ACTUATOR

BACKGROUND

This invention is related to apparatus described in U.S. Pat. No. 3,320,599 by S. A. Billawala and entitled "Mounting and Actuating Apparatus for a Magnetic Head."

Magnetic memory disk files have become an important item of computer peripheral equipment for storage of digital information. In these disk files, a rapidly rotating disk having a magnetic recording film of the surface, stores the data. A magnetic recording transducer is arranged near the disk and in some embodiments "files" or "floats" on a thin film of air created by the moving disk. These air film bearings are stable only when the disk is in rapid motion and therefore, means are provided for retracing and advancing the head supporting the transducers to prevent contact with the disk when it is stopped or traveling at low speed.

A convenient arrangement for retracting the head employs a spring biasing the head away from the disk. A pneumatic actuator on the opposite side of the head from the disk counteracts the bias of the spring for advancing the head towards the disk when desired. Typically, in the prior art, the pneumatic actuator has involved diaphragms, spacers, seal rings, and the like that are cumbersone to assemble and expensive to manufacture. Further, in order to bring pressurized air to the pneumatic actuator, small diameter plastic tubes are employed and these must be supported and sealed to the actuator. Typically this has been done by adhesively bonding the tube through a wall of the actuator which is cumbersome in manufacturing and suffers from reliability problems.

On a typical disk file several recording heads may be employed at approximately the same radial distance from the center of the disk so that the pneumatic pressure required to actuate the heads is approximately the same. In the past the several heads have been actuated by air lines coming from a single manifold so that although the heads are actuated at about the same time and only a single pressure regulator is required, provision of such a pressure manifold is an expense that is preferably avoided.

BRIEF SUMMARY OF THE INVENTION

Thus, in practice of this invention according to a presently preferred embodiment, there is provided a pneumatic actuator formed of two elastomeric parts, at least one of which has a flexible diaphragm integral therewith. One part has a shallow female cone and the other has a shallow male cone in engagement therewith for sealing the air chamber of the actuator.

Means are provided for sealing a rigid wall tube in the air chamber comprising an elastomeric sleeve having an inside diameter smaller than the outside diameter of the tube and surrounding the tube so that chamber pressure is transmitted therethrough to the rigid tube wall for effecting a seal. In combination with the conical seal, a passage through the elastomeric part has a diameter the same as the outside diameter of the tube for preventing deformation of the conical seal.

DRAWINGS

These and other features and advantages of the invention will be appreciated as the same becomes better understood by reference to the following detailed description of a presently preferred embodiment when considered in connection with the accompanying drawings wherein.

Throughout the drawings like numerals refer to like parts.

DESCRIPTION

Figure 1:
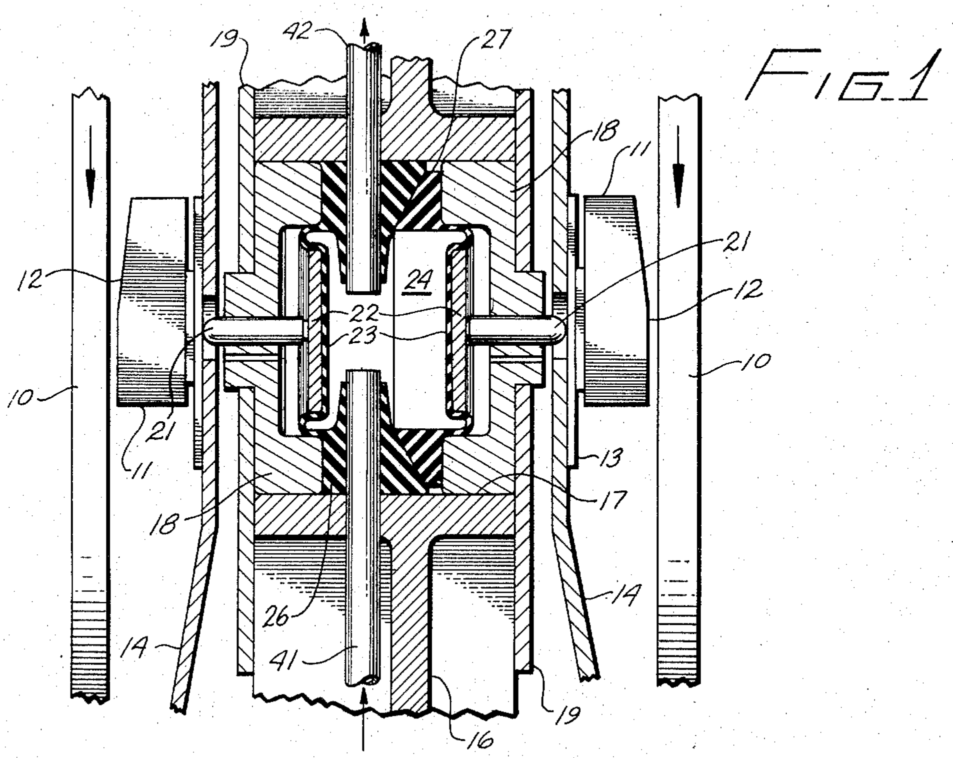
FIG. 1 is a fragmentary cross section through a magnetic disk memory system incorporating principles of this invention.

FIG. 1 illustrates in a fragmentary cross section a portion of a magnetic disk file having a pneumatic actuator constructed according to principles of this invention. Additional aspects of such a disk file and actuator are set forth in greater detail in the aforementioned U.S. Pat. No. 3,320,599. In a typical disk file of this type, two or more magnetic memory disks 10 are mounted to rotate about a common axis so that a face of the disk travels rapidly past a recording head 11. In such an arrangement recording heads are provided on opposite sides of each of the disks 10 so that the forces on the disk are balanced; however, the additional heads are deleted in the drawings of this application for purposes of clarity. It will also be apparent that some of the distances and angles as illustrated in FIG. 1 are somewhat exaggerated for purposes of illustration. Thus, for example, the head 11 is, during normal operation, spaced from the disk 10 by only a few tens of microinches and the angle on the bearing face 12 of the head is typically only a few minutes of arc.

Each of the recording heads 11 typically has a plurality of magnetic recording transducers (not shown) in the face 12 which is adjacent the recording disk. These transducers are employed for writing and reading information in a thin magnetic recording film (not shown) on the face of the disk 10. Each of the recording heads is mounted on a gimbal spring 13 described in greater detail in the aforementioned patent which biases the recording head away from the disk so that in this retracted position there is an appreciable distance between the head and disk. The gimbal springs 13 are in turn connected to rigid members 14 forming a portion of a head mounting structure on which a plurality of magnetic recording heads may be mounted. The mounting structure has a mounting plate 16 which is typically a casting having webs and ribs in order to obtain stiffness without undue addition of weight. The rigid head mounting members 14 are secured to the mounting plate 16 in any convenient manner (not shown).

A transverse circular aperture 17 is provided through the mounting plate 16 behind each of the recording heads 11 and an actuator as provided in practive of this invention is mounted in each of these apertures. At least a portion of the actuators are double acting, that is, a pair of opposed recording heads 11 are moved by a single actuator such as in the embodiment illustrated in FIG. 1. As will be apparent hereinafter, if it is desired to actuate only a single head, one side of the actuator can be essentially a dummy. A pair of retaining ring/-guide sleeves 18 are positioned in the aperture 17 and held in place by conventional retainers 19 held in place on mounting plate 16 by means not shown. A piston pin 21 extends through each guide sleeve and has a rounded end that bears against its respective gimbal spring 13. The opposite end of each piston pin 21 bears against a rigid disk 22, the opposite face of which is against a flexible diaphragm 23.

Each of the two diaphragms 23 is integral with an elastomeric member, a pair of which cooperate to form an air chamber 24 within which pneumatic pressure can be applied. These are preferably a female member 26 and a male member 27 described in greater detail hereinafter. The air chamber 24 is defined by the two diaphragms 23, the internal cylindrical surface 38 of the male member 27, and the internal cylindrical surface 25 of the female member. These two members are seen in cross section in FIG. 1 and also in enlarged cross section in FIG. 2 with the other associated portions of the actuator deleted for purposes of clarity. The sealing face of the female member 26 is also seen in FIG. 3.

The female member 26 comprises a ring 28, the outer survace 29 of which in the form of a cylinder which, during use, abuts the inside of the aperture 17 through the mounting plate 16. The outer surface 29 is coaxial with the inner cylindrical surface 25. The ring also has a flat face 31 which abuts against a face of one of the retainer rings 18. The opposite face of the ring 28 is a female conical surface 32 which is typically at an angle of 60° from the axis of the cone, which is normal to the flat face 28. One of the diaphragms 23 is integral with the ring 28, preferably being formed in the same molding operation. If desired a thin fabric reinforcement (not shown) can be embedded within the elastomer forming the diaphragm for strengthening pruposes. The diaphragm 23 is what is known as a rolling diaphragm having a peripheral convolution 33 which permits the face of the diaphragm to move a substantial distance without significant change in the pressure required to effect the movement. Thus when air pressure is applied to rolling diaphragm, the principal forces resisting movement are generated by the mechanisms actuated by the diaphragm rather than by the diaphragm itself.

The male member 27 is also elastomeric and is integral with the other diaphragm 23. It has a flat face 36 substantially parallel to the diaphragm 23 which during use abuts against the other retainer ring 18. Opposed to the flat face 36 is a male conical face 37, the angle of which is the same as the angle of the conical face 32 on the female member. Thus when the two members are assembled, the two conical faces 32 and 37 are in tight engagement. The retaining rings 18 bearing against the opposed flat faces 31 and 36 on the female and male members 26 and 27, respectively, serve to hold the two conical faces in engagement. The two elastomeric members held in tight engagement all aroung the cone by the retaining rings thus serve to seal the air chamber 24 between the two diaphragms.

The male elastomeric sealing member 27 has an inside cylindrical surface 38 which forms a wall of the air chamber 24. Air pressure within the chamber acting on this wall tends to press the male member outwardly so that the conical surface 37 engages the opposed female conical surface 32 with greater force. The male member is thus pinched or wedged between the female member and the retainer ring 18. This pinching or wedging action is obtained since the elastomeric members are constrained between the two opposed retaining rings 18 and the surrounding aperture 17 in the mounting plate. Thus, the higher the pressure in the air chamber 24 the tighter the seal of the chamber.

In order to introduce air pressure into the air chamber 24, a tube 41 extends from a pressure regulator (not shown) and has an end opening into the air chamber. A second tube 42 also has an end entering the air chamber 24. The second tube 42 opening into the air chamber communicated with another similar pneumatic actuator (not shown) so that at lest a portion of the plurality of head actuators in a disk file are connected in serial rather than in parallel, thereby avoiding the necessity for a pressure manifold having tubes connected to each of several actuators. Previously it has not been practical to employ pneumatic actuators in series because of the difficulties attendant with sealing a pressure tube into the air chamber of the actuator. With the present invention sealing of the tubes to the pressure actuators is so much easier than sealing to the prior pressure manifold, that several such actuators may be economically connected in series.

Figure 2:
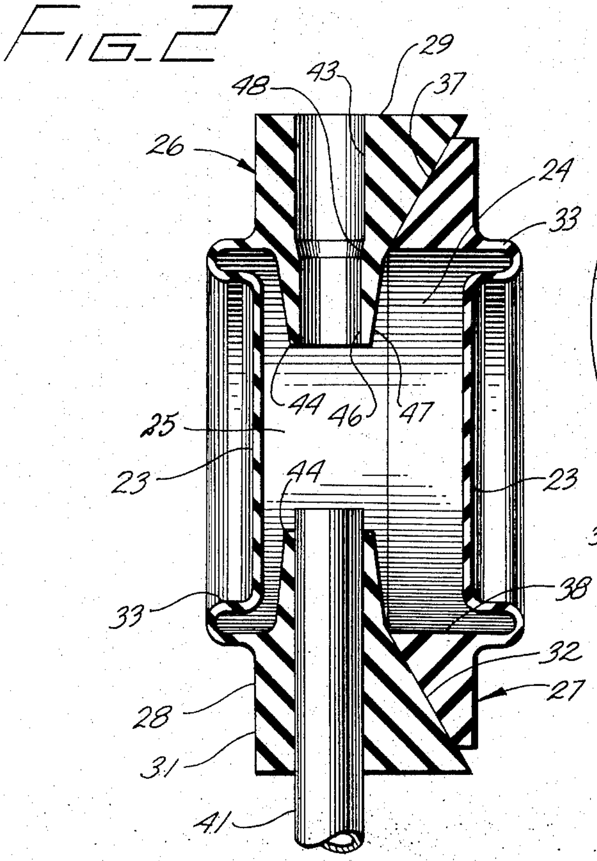
FIG. 2 is an enlarged detail in transverse cross section of a pneumatic actuator employed in the embodiment of FIG. 1.
Figure 3:
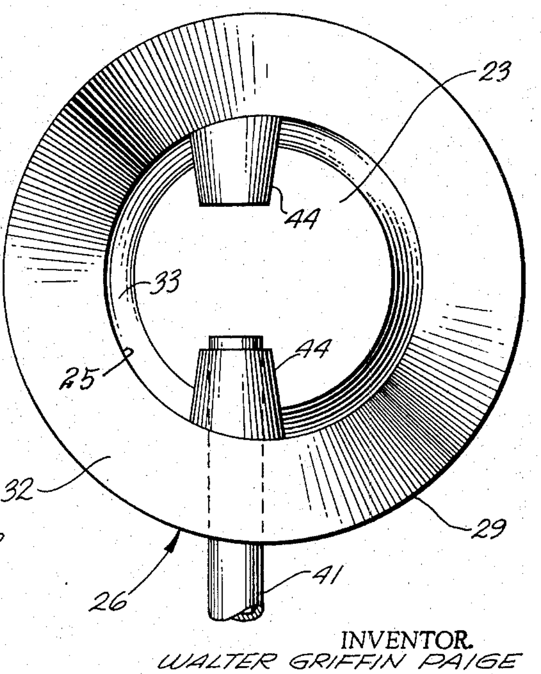
FIG. 3 is a face view of one member of the actuator of FIG. 2.

FIGS. 2 and 3 show in greater detail the mode of sealing the pneumatic tubes into the air chamber. One of the tubes is withdrawn from the illustration of FIGS. 2 and 3 in order to more clearly show the sealing feature. A passage 43 is provided through the ring 28 of the female member forming the air chamber. The inside diameter of the passage 43 is the same as the outside diameter of the tube that is to be inserted through the passage for bringing air pressure through the wall. The length of the passage through the ring is substantially the same as the width from the inside to the outside of the ring so that when a rigid wall tube is inserted through the passage 43 the elastomeric material forming the ring is not deformed thereby. This assures that the conical surface 32 on the female member is not distorted and the seal of the air element is maintained. If the inside diameter of the passage 43 through the ring is more than a minor amount different from the diameter of the tube to be inserted therethrough the conical sealing surface which is in close proximity thereto may be deformed so that the air chamber leaks. If the passage is too small the female member is bulged to prevent complete sealing. If the passage is too large, the elastomer may "collapse" into the gap between the rigid tube and the ring and reduce the seal effectiveness.

Integral with the ring 28 forming the wall of the air chamber and aligned with the passage 43 is a sleeve 44 having a cylindrical passage 46 therethrough and a conical outside surface 47. This results in a tapered wall for the sleeve 44 relatively thinner near its tip and relatively thicker near its attachment to the ring 28. The passage 46 through the sleeve has an unstretched diameter smaller than the outside diameter of the rigid walled pneumatic tube and smaller than the diameter of the passage 43 through the ring. Preferably a tapered transition 48 is provided between the two passages for ease in inserting the pneumatic tube.

When a rigid wall tube is inserted through the passages 43 and 46, it fits easily through the larger diameter passage 43 through the ring which thereby serves to hold the tube in alignment but is substantially ineffective in providing a seal to the wall of the tube. As the tube passes through the smaller diameter passage 46 through the sleeve, the elastomeric material is stretched so as to fit tightly on the tube and seal against its wall. When air pressure is applied within the chamber, it bears on the outside of the sleeve 44 and hence presses it tightly against the rigid wall of the tube thereby effecting a tighter seal against the tube as the pressure is increased. The tapered wall of the sleeve is advantageous in providing flexibility near the thin tip to assure pressure enhanced sealing and at the same time providing a sufficiently thick wall near the base of the sleeve to prevent buckling as a tube is withdrawn or tearing as a tube is inserted.

In the double acting actuator illustrated in FIG. 1, air pressure applied through the tube 41 increases the pressure in the air chamber 24 and in any similar air chamber connected to the outlet tube 42. The increased air pressure acts on the rolling diaphragms 23 displacing the disk 22 and the piston 21 away from the actuator and towards the gimbal spring 13. The force on the gimbal spring displaced it in the conventional manner pushing the head 11 towards the moving disk 10 until a fluid film bearing forms therebetween. The continuing force generated by the pressure in the air chamber resists the force generated by the fluid film bearing between the recording head and the disk. When air pressure in the chamber 24 is relieved the gimbal spring 13 returns the head toward the illustrated position and collapses the diaphragm towards its retracted position as illustrated.

The seal of the pneumatic chamber 24 is maintained by the conical sealing surfaces pressed together by the retaining rings 18 whether or not there is pressure within the chamber. Increasing pressure within the chamber pinches the male conical member more tightly in engagement with the female conical member and further guarantees a seal. The pneumatic tubes 41 and 42 entering the air are sealed by the tapered sleeve 44 whether or not there is air pressure in the chamber and increasing air pressure presses the sleeve against the rigid wall of the tube further guaranteeing a seal.

The two part sealed air chamber and diaphragm combination is readily manufactured since the elastomeric parts can be made is simple tooling and because of the elasticity stripped off of the tooling without requiring complex motions as would be required for molding rigid parts in the same general shape. The parts are therefore quite inexpensive and readily produced in quantity. They can also be handled with facility in order to assemble air chambers and insert the pneumatic tubes since no special sealing adhesives or the like are required. Sealing reliability has been vastly improved. The combination is also advantageous since the higher the pressure in the pneumatic chamber, the more secure is the seal that is made between the parts. The number of parts in a magnetic memory disk file is also reduced since it is no longer necessary to have a pressure manifold and the several actuators can be connected in series instead of in parallel.

The parts forming the air chamber are also useful in the last actuator in such a series since it is only necessary to provide a plug instead of a tube through one of the sleeves. The same air chamber is also useful when only one head need be actuated by merely providing a cavity approximately the shape of the diaphragm that is unused. When air pressure is applied to the chamber the small displacement of the unused diaphragm to fill the space between it and the "plug" in no way affects the operation of the other diaphragm in the same actuator. The internal volume of the air chamber is small and the time required for displacing the diaphragms or for filling a series of air chambers to a desired pressure is quite minimal compared with the response time of the balance of the apparatus.

Although the one embodiment of this invention has been described and illustrated herein many modifications and variations will be apparent to one skilled in the art. Thus, for example, it is not necessary that the sleeves 44 sealing about the pneumatic tubes have a tapered wall and a cylindrical wall can be employed if desired. Another possible modification involves small internal sealing ridges within the passage through the sleeve to enhance the local pressure on the inserted tube. However, no necessity for this additional refinement has been found. It will also be apparent that the tube seals can be through the elastomeric member having the male sealing surface rather than the female conical surface: Many other modifications and variations will be apparent to one skilled in the art and it is therefore to be understood that within the scope of the appended claims the invention may be practiced otherwise than as specifically described.

What is claimed is:

1. A pneumatic actuator comprising:

a first elastomeric member having a female conical surface;

a second elastomeric member having:

a male conical surface complementary to the female conical surface and engaged therewith, an external surface transverse to the axis of the conical surface, and an internal cylindrical surface coaxial with and intersecting the male conical surface so that at least a portion of internal pressure acting on the cylindrical surface is transmitted to the conical surface;

a rolling diaphragm integral with one of the members;

means for pressing the first and second members towards each other adjacent their peripheries and with sufficient clearance for motion of the diaphragm; and a tube seal through one of the members for admitting pneumatic pressure within the actuator.

2. A pneumatic actuator as defined in Claim 1 wherein the conical surfaces are at an angle of about 60 ° from the axis of the cone whereby internal pressure wedges the second elastomeric member between the female conical surface and the means for pressing.

3. A pneumatic actuator comprising: a first elastomeric member having:

a female cone, an outer cylindrical surface normal to the axis of the cone and intersecting the conical surface, an inner cylindrical surface concentric with the outer cylindrical surface and intersecting the conical surface, and a plane external surface normal to the axis of the cone;

a second elastomeric member having a male cone complementary to the female cone and engaged therewith;

a rolling diaphragm integral with one of the members;

means for pressing the first and second members towards each other adJacent their peripheries and with sufficient clearance for motion of the diaphragm; and a tube seal through one of the members for admitting pneumatic pressure within the actuator comprising:

a passage through the first member between the outer cylindrical surface and the inner cylindrical surface, and an elastomeric sleeve integral with the first member and having an inside diameter smaller than the inside diameter of the passage and coaxial therewith, the sleeve extending into the interior of the actuator so that a portion of the chamber pressure is transmitted through the wall of the sleeve for sealing against the outside of a tube in the passage.

4. A pneumatic actuator as defined in Claim 3 wherein the first member comprises a second tube seal through the wall thereof; and further comprising a second flexible diaphragm, each of the diaphragms being integral with a respective one of the elastomeric members and transverse to the axis of the cones.

5. A pneumatic actuator as defined in Claim 3 wherein the second member comprises a plane surface normal to the axis of the cone and intersecting the male conical surface; and an internal cylindrical surface normal to the plane surface and intersecting the male conical surface so that internal pressure in the actuator acting on the internal cylindrical surface wedges the first member outwardly between the female conical surface and the means for pressing the members towards each other.

* * * * *

PO-1050
(5/69)

UNITED STATES PATENT OFFICE
CERTIFICATE OF CORRECTION

Patent No. 3,785,251 Dated January 15, 1974

Inventor(s) Walter G. Paige

It is certified that error appears in the above-identified patent and that said Letters Patent are hereby corrected as shown below:

Title, "SEALING COMPOSITION FOR PNEUMATIC ACTUATOR" should read --SEALING COMBINATION FOR PNEUMATIC ACTUATOR--.

Column 1, line 15, "files" should read --flies--;
line 18, "retracing" should read --retracting--.

Column 2, line 60, "practive" should read --practice--.

Column 3, line 23, "survace" should read --surface--.

Column 4, line 38, "element" should read --chamber--.

Column 5, line 17, --pin-- should be inserted after "piston" and before "21";
line 36, --chamber-- should be inserted after "air" and before "are";
line 42, "is" should read --in--.

Column 6, line 19, after "surface" the colon should be a period.

Signed and sealed this 21st day of May 1974.

(SEAL)
Attest:

EDWARD M. FLETCHER, JR.
Attesting Officer

C. MARSHALL DANN
Commissioner of Patents